United States Patent Office 3,278,315
Patented Oct. 11, 1966

3,278,315
METHOD FOR PRODUCING FROZEN CITRUS FRUIT JUICE
Wallace Warrant Brown, John W. Brown, and William G. Mitchell, Dade City, Fla., assignors to Pasco Packing Co., Dade City, Fla., a corporation of Florida
No Drawing. Filed Apr. 18, 1962, Ser. No. 188,567
10 Claims. (Cl. 99—205)

This invention relates to a citrus fruit product. More particularly, present invention is concerned with a method of producing a frozen citrus fruit product and the product produced whereby improved stability, storage life, character and flavor are imparted to the product.

Frozen concentrated citrus juices are well known in commerce for many years but are known to be subject to serious quality defects which are undesirable to the consumer. Among these defects are gelation and clarification which affect both the taste and appearance of the product. The products produced according to presently known methods are normally stored in a frozen condition at or below 0° F. and as is well known are diluted before consumption by the consumer with water to the strength of the original juice. To prevent stability deterioration, frozen concentrates are maintained at 0° F. or below from the time of manufacture through the steps of storage, shipment and display by distributors and dealers. However, in the course of the transportation and handling or storage and display by distributors and dealers and certainly at the time the product is in the hands of the consumer the temperature of the frozen citrus juice will for varying periods be raised considerably above 0° F.

It has been determined that this rise in temperature has an adverse effect upon the quality of the concentrated citrus juice and specifically may permit an interaction between the pectinesterase, pectase and/or other enzymes with the pectin to cause gelation of the concentrate or the separation or settled appearance of the rehydrated juice produced from the concentrate. It has further been determined that the pectin destroying enzyme activity of fruits and juices is identified with the insoluble matter containing them. The natural function of these enzymes is to deesterify the pectins, break down pectoses to form pectins and further reduce the pectin to pectinic acid, which can combine with the natural calcium content of the fruit or juice to form and precipitate as calcium pectates. This natural function has a tendency gradually to clarify the juice and precipitate all insoluble matter to leave a clear serum. Where it is necessary to incorporate, in a final juice, gross particles of insoluble fruit solids such as the whole fruit cells of citrus juices, a greater proportion of enzyme activity is introduced, and clarification of the juice is hastened. In the case of concentrates, the effect of the precipitated calcium pectate is to tend to gel or make semi-solid the whole concentrate.

It has been recognized that the pectin destroying enzyme activity can be reduced or completely destroyed by the application of heat to the enzymes. This may be accomplished by heating the insoluble pulpy portion of the juice. However, the use of heat to eliminate the enzyme activity of enzymes unfortunately destroys, at least partially, the fresh flavor of the juice by caramelization of the juice and further by vaporization of the highly volatile flavoring constituents or by changing the character of the constituents. While in some cases the loss in flavor may not be very great, it nevertheless is noticeable in comparison with fresh juice and such a product, therefore, has limited saleability.

Accordingly, it is the principal object of the present invention to provide a method and product from citrus fruit which retains the desirable fresh flavor, appearance and aroma of the natural citrus juice and which will be stable under more adverse conditions as compared to presently known products.

It is also an object of the present invention to provide a method for producing a citrus fruit product and the product produced thereby which does not gel as a concentrate or will not clarify or settle upon rehydration.

This invention also has an object the provision of a method for producing or product which does not require heating of the citrus fruit, juice or pulp and, therefore, avoids the loss of the volatile flavor constituents.

A more particular object of the present invention is to provide a method for preventing the enzymes from reacting with the pectin to cause gelation of the concentrate or separation of the juice made from the concentrate.

A further, more particular object of the present invention is the provision of a method for maintaining the enzymes immobilized and physically separated from the pectin by which a reaction between the enzymes and pectin is prevented.

These and other objects of the present invention will become apparent upon careful consideration of the following detailed description.

Briefly, the present invention is concerned with the method and the product produced wherein the juice and insoluble pulp of a citrus product is separated into a juice portion and an insoluble pulp mass containing the pectin destroying enzymes, pectase and pectinesterase, etc. The insoluble pulp mass is then frozen by cooling the pulp mass to a temperature of approximately 28° F., or below, depending upon the soluble content in the pulp, and then the juice which may be concentrated is combined with the frozen pulp mass while maintaining the temperature no greater than 28° F. in order that the insoluble pulp mass remain frozen. The product produced will maintain the enzymes in the insoluble pulp mass separated and isolated from the pectin in the juice, thereby preventing any reaction between the enzymes such as pectinesterase, pectase, etc., and the pectin which would cause gelation, clarification and off-flavor. A specific example of the use of the present invention follows.

The citrus fruits with which the present invention is concerned are the conventional fruits such as oranges, lemons, limes, grapefruits and the like. The usual steps of inspecting the fruit for defects, washing the fruit, sterilization, rinsing, and juice extraction are first performed on the citrus fruits by well known procedures commonly used in the art. The extracted juice and insoluble pulp is then processed to effect a separation of an insoluble pulp mass from the juice. The method of extraction may be by screening or centrifuging by any common procedure. The two portions, one of which comprises the gross pulp particles or mass and the other the juice, effects a gross separation of the enzymes from the pectin inasmuch as the enzymes, such as pectinesterase and pectase, will be contained in the insoluble pulp mass. The juice can, of course, be further screened or centrifuged to collect the smallest particles of the insoluble pulp mass if it is desired to remove essentially all of the enzymes. However, a simple conventional screening or centrifuging will usually be adequate. A centrifuged separation would remove all but the finest particles and would produce a juice with maximum stability. The juice portion is then concentrated by any of the commonly used methods which may include freeze concentration, vacuum evaporation or distillation of the water in the juice to produce a liquid concentrate which should be in the range of approximately 20° to 70° Brix.

Upon the separation of the citrus fruit into two portions, namely, the insoluble pulp mass and juice, the unique aspects of applicants' invention become apparent.

For instance, it has been determined that the insoluble pulp containing the enzymes normally has a soluble solids content of no higher than approximately 18° to 9° Brix, and will freeze at a temperature of approximately 26° to 28° F., respectively. As can be readily understood, a higher juice soluble content, such as the natural sugar present in the fruit, will lower the freezing point of the pulp. For instance, an 18° Brix soluble content will lower the freezing point of from approximately 28° F. for a 9° Brix content to approximately 26° F. In contrast, the freezing point of the juice concentrate is considerably lower due to the significantly higher soluble solids content obtained from the juice concentration step to 20° to 70° Brix. The freezing point is, of course, dependent upon the percentage of soluble solids, i.e. a tangerine concentrate having 20 percent soluble solids would freeze at the same temperature as an orange concentrate of 20 percent soluble solids. It is on the basis of these definitive freezing aspects of the juice and the insoluble pulp mass that the present invention is derived.

It has been discovered that if the insoluble pulp mass is frozen by reducing its temperature to about 26° F. to 28° F., or below, the enzymes will be tightly bound witthin this frozen mass of insoluble pulp and, therefore, as long as this insoluble pulp mass remains frozen, the enzymes would be essentially isolated from their surroundings, even if the surroundings were liquid juice which contained a pectin. The theory behind this discovery is that when the enzymes are maintained in a medium having a high freezing point, such as the pulp mass, rather than a low freezing medium such as the juice, the enzymes are isolated and immobilized and cannot react with the pectin unless the pulp is melted. Consequently, it has been determined that when the insoluble pulp mass is maintained in frozen condition, the temperature of the entire citrus fruit product, which would include the juice portion and the insoluble pulp mass, can be maintained at a temperature up to approximately 26° to 28° F., since at this temperature the insoluble pulp mass remains frozen and no reaction will occur with the enzymes in this pulp. This would permit greater variations of the surrounding temperature which the juice product would normally encounter, resulting in greater flexibility in the requirements for storage.

The freezing of the insoluble pulp mass may produce a solid unitary mass in a block form or actually the frozen pulp mass may take the form of pellets or smaller unit sizes. The size of the frozen pulp mass units is not critical, but rather only the temperature at which they are maintained is important.

When the insoluble pulp mass is frozen, it can be added to a suitable container or can and then the container or can filled with the juice concentrate which, of course, cannot be higher in temperature than 28° F. The juice and the frozen pulp therefore are to remain as separate entities even though they may be commingled. The closing of the container can be done by conventional means; however, again, the contents of the can cannot be raised to a point to which the insoluble pulp mass containing the enzymes will liquefy and therefore have the opportunity of reacting with the pectin of the juice concentrate.

The juice concentrate is normally filled in the container at about 17° to 20° F.; however, these temperatures are not critical as long as they are not such as to melt the frozen insoluble pulp mass when the juice concentrate is combined with the frozen pulp mass. It is therefore possible to add the juice concentrate as a cold liquid or the juice concentrate may be frozen in a block and the frozen juice concentrate added to the can or container along with the frozen pulp mass. It is an important aspect of the present invention that when the juice is combined with the frozen pulp mass either as liquid or solid, the pectin would be isolated from the pectinesterase and pectase as long as the latter were in the frozen insoluble pulp mass.

The citrus product can be rehydrated upon thawing in the conventional manner to produce a flavorful, fresh tasting citrus juice.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the appended claims.

We claim:

1. A method of producing a stable citrus fruit product by substantially preventing the interaction of the enzymes in the gross pump with pectin in the juice comprising: extracting from the citrus fruit the juice and insoluble pulp containing gross pulp particles, separating the juice from the insoluble pulp, concentrating the juice, freezing the insoluble pulp, cooling the juice to a temperature below the freezing temperature of the pulp, combining the cooled concentrated juice and the frozen insoluble pulp, and maintaining the temperature of the frozen insoluble pulp and concentrated juice no greater than approximately 26° to 28° F.

2. A method of producing a stable frozen citrus product by substantially preventing the interaction of the enzymes in the gross pump with pectin in the juice including: extracting the juice and insoluble pulp containing gross pulp particles from a citrus fruit, separating the juice from the insoluble pulp, concentrating the juice, cooling the concentrated juice below 28° F., cooling the insoluble pulp to a temperature no greater than approximately 28° F. to solidify said pulp, and combining the solidified pulp with the cooled concentrated juice at a temperature not greater than 28° F.

3. A method of producing a stable citrus fruit product by substantially preventing the interaction of the enzymes in the gross pump with pectin in the juice comprising: extracting from the citrus fruit the juice and insoluble pulp containing gross pulp particles, separating the juice from the insoluble pulp, concentrating the juice, cooling and solidifying the juice to a temperature of approximately 17° to 20° F., freezing the insoluble pulp, combining the solidified juice and the frozen insoluble pulp, and maintaining the temperature of the frozen insoluble pulp no greater than approximately 28° F.

4. The method of improving the stability of citrus fruit product by substantially preventing the interaction of the enzymes in the gross pulp with pectin in the juice comprising: extracting the juice and insoluble pulp containing gross pulp particles from the citrus fruit, separating a first portion containing a major amount of the enzymes in the citrus fruit and a second portion containing the juice, freezing the first portion, concentrating said juice and combining the first portion and second portion while maintaining the temperature of the first portion no greater than approximately 28° F.

5. The method of claim 1, wherein the juice is concentrated to a Brix of 20° to 70°.

6. The method of claim 3, wherein the juice is concentrated to a Brix of 20° to 70°.

7. A method of producing a stable citrus fruit product by substantially preventing the interaction of the enzymes in the gross pulp with pectin in the juice comprising: extracting from the citrus fruit the juice and insoluble pulp containing gross pulp particles, separating the juice from the insoluble pulp, concentrating the juice, freezing the insoluble pulp at a temperature not greater than 28° F., cooling the juice to a temperature below the freezing temperature of the pulp, combining the cooled concentrated juice and the frozen insoluble pulp, and maintaining the insoluble pulp frozen and the temperature of the frozen insoluble pulp and concentrated juice no higher than approximately 26° to 28° F. to retain enzymes within the continuously frozen insoluble pulp.

8. A method of producing a stable frozen citrus product by substantially preventing the interaction of the enzymes in the gross pulp with pectin in the juice including: extracting the juice and insoluble pulp containing gross pulp particles from a citrus fruit, separating the juice from the insoluble pulp concentrating the juice and lowering the freezing point of the juice below the freezing point of the insoluble pulp, cooling the concentrated juice below 28° F., cooling the insoluble pulp to a temperature no greater than approximately 28° F. to solidify said pulp, and combining the solidified pulp with the cooled concentrated juice while maintaining the insoluble pulp frozen and at a temperature not greater than 28° F. to retain enzymes within the continuously frozen insoluble pulp.

9. A method of producing a stable citrus fruit product by substantially preventing the interaction of the enzymes in the gross pulp with pectin in the juice comprising: extracting from the citrus fruit the juice and insoluble pulp containing gross pulp particles, separating the juice from the insoluble pulp, concentrating the juice and lowering the freezing point of the juice below the freezing point of the insoluble pulp, cooling and solidifying the juice to a temperature of approximately 17° to 20° F., freezing the insoluble pulp, combining the solidified juice and the frozen insoluble pulp, and maintaining the insoluble pulp frozen and the temperature of the frozen insoluble pulp no greater than approximately 28° F. to retain enzymes within the continuously frozen insoluble pulp.

10. The method of improving the stability of citrus fruit product by substantially preventing the interaction of the enzymes in the gross pulp with pectin in the juice comprising: extracting the juice and insoluble pulp containing gross pulp particles from the citrus fruit, separating a first portion containing a major amount of the enzymes in the citrus fruit and a second portion containing the juice, freezing the first portion, concentrating said juice and lowering the freezing point of the juice below the freezing point of the insoluble pulp, and combining the first portion and second portion while maintaining the insoluble pulp frozen and the temperature of the first portion no greater than approximately 28° F. to retain enzymes within the continuously frozen insoluble pulp.

References Cited by the Examiner
UNITED STATES PATENTS

| | | | |
|---|---|---|---|
| 2,187,572 | 1/1940 | Meinzer | 99—205 |
| 2,419,909 | 4/1947 | Noyes | 99—205 |
| 2,588,337 | 3/1952 | Sperti | 99—205 |
| 2,724,652 | 11/1955 | Brent et al. | 99—205 |
| 2,929,719 | 3/1960 | Walburn | 99—205 X |
| 3,053,668 | 9/1962 | Lund | 99—205 |

A. LOUIS MONACELL, *Primary Examiner.*

HYMAN LORD, *Examiner.*

ROSCOE S. AULL, Jr., *Assistant Examiner.*